Feb. 2, 1965 A. S. ROBINSON 3,168,643
ENCODER
Original Filed April 15, 1959 3 Sheets-Sheet 2
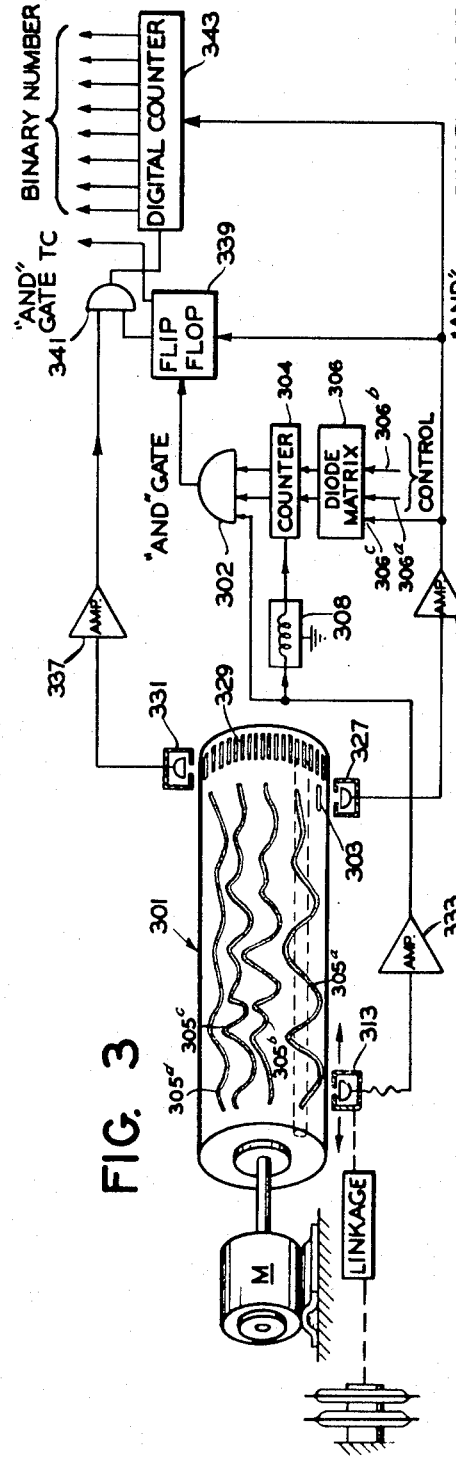
FIG. 3
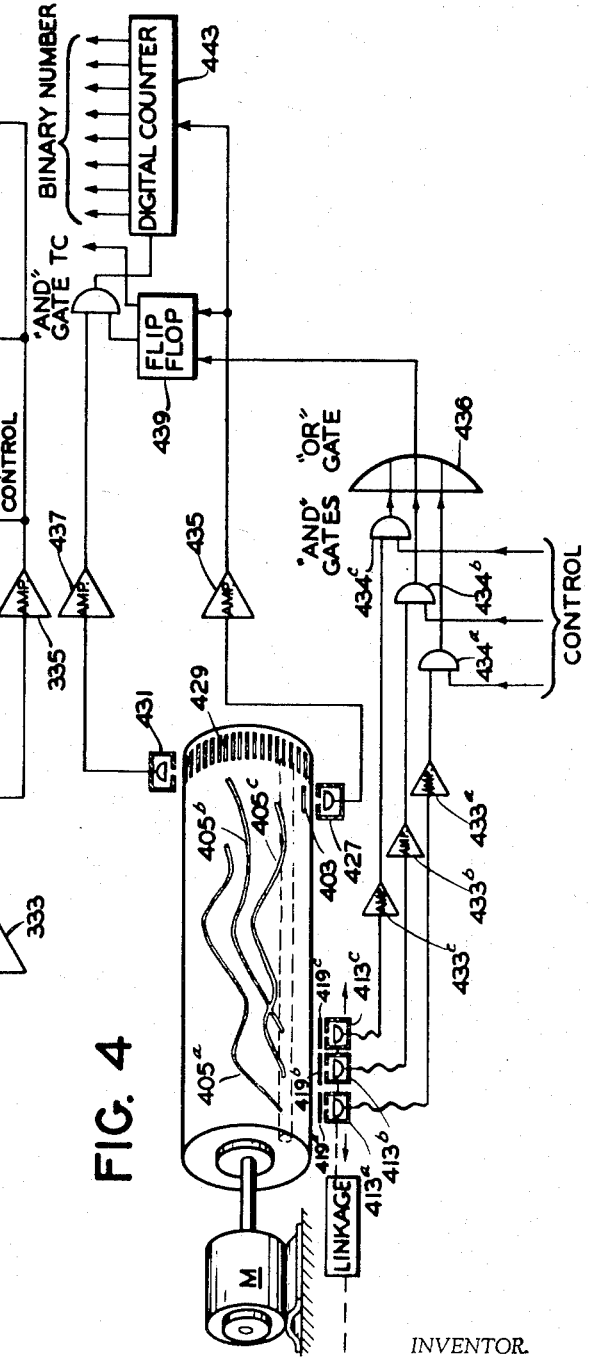
FIG. 4
INVENTOR.
ARTHUR S. ROBINSON
BY
ATTORNEY 3,168,643
ENCODER
Arthur S. Robinson, South Huntington, N.Y., assignor to The Bendix Corporation, a corporation of Delaware
Original application Apr. 15, 1959, Ser. No. 806,625. Divided and this application Jan. 2, 1964, Ser. No. 335,126
20 Claims. (Cl. 235—61.6)

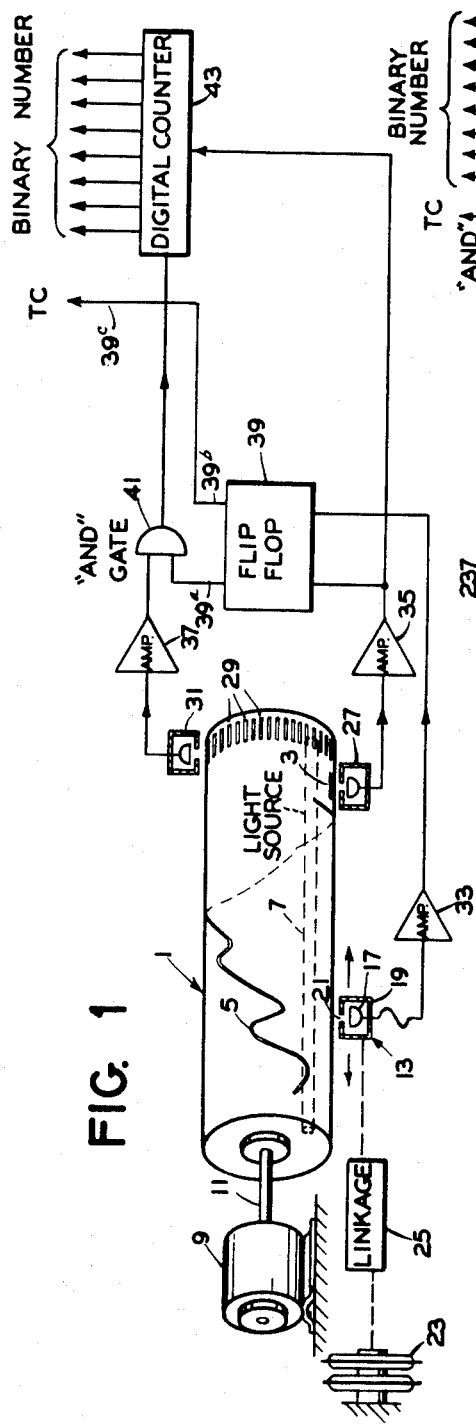
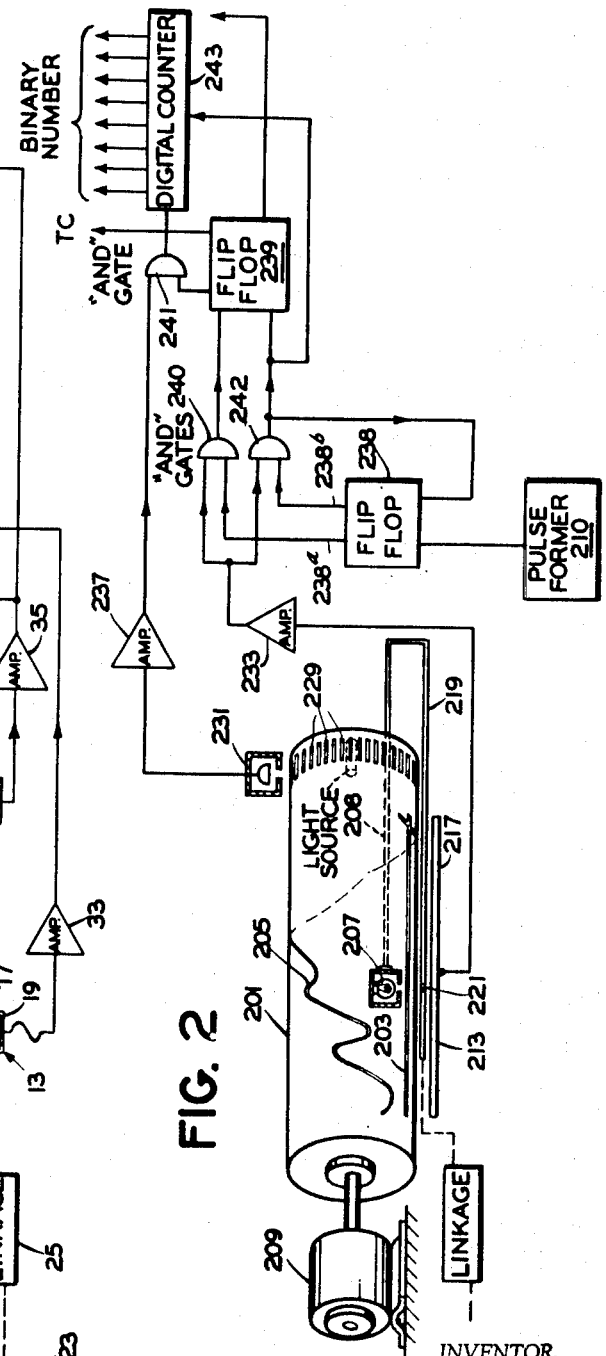

This invention relates to encoders and more particularly to analog to digital encoders for converting mechanical displacements to digital numbers. This application is a division of application Serial No. 806,625 filed April 15, 1959.

One object of the invention is to provide an encoder which converts a mechanical displacement to a digital number according to an arbitrary predetermined function of the displacement and which is accurate, compact, light in weight and has a high degree of resolution.

Another object of the invention is to provide an encoder which provides a substantial number of arbitrary functions of a variable on a single unit.

Another object is to provide an encoder in which the functions are truly arbitrary and may include steep slopes and discontinuities.

Another object of the invention is to provide an encoder which operates independently of the encoder drive motor speed.

Another object is to provide an encoder which is simple in design and may readily be mass produced.

Another object is to provide an encoder in which intelligence may be encoded on a cylinder or disc or any other suitable device.

The invention contemplates a function encoder comprising a member, such as a cylinder or disc, having intelligence thereon corresponding to a preselected function which varies in value in accordance with a condition, pick-up means for scanning the member and providing signals, and means for controlling the pick-up means in accordance with the condition so that the signals from the pick-up means correspond to the condition according to the preselected function. The signals may comprise a series of pulses which may be applied to a counter so that the digital output of the counter corresponds to the condition according to the preselected function.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as definnig the limits of the invention.

In the drawings:

FIGURE 1 is a schematic diagram of a novel encoder constructed according to the invention.

FIGURE 2 is a schematic diagram similar to FIGURE 1 showing a second embodiment of the invention.

FIGURES 3 and 4 are schematic diagrams of novel encoders having several functions on a single cylinder.

Figure 5:
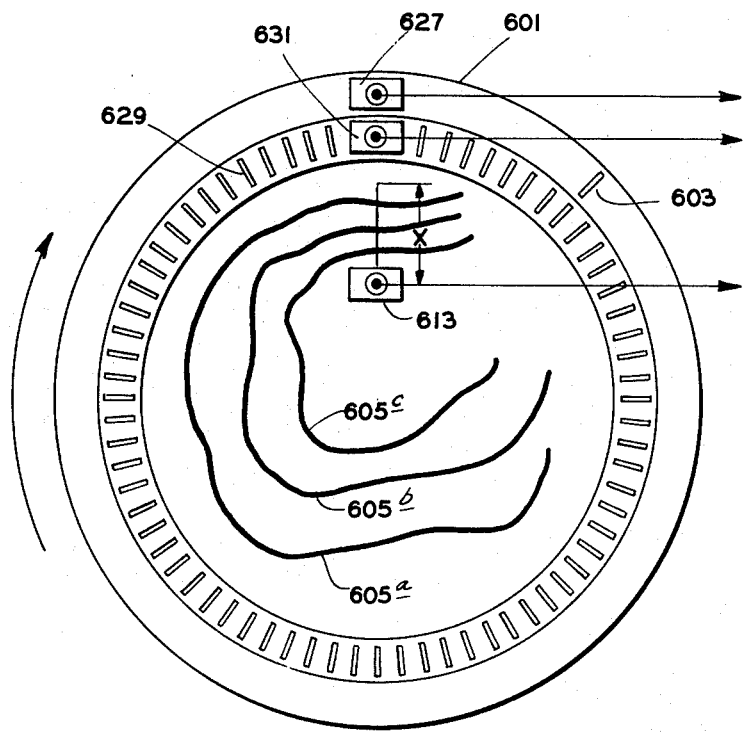
FIGURE 5 is a schematic diagram showing another embodiment of the invention in which the function is stored on a disc instead of a cylinder.

In FIGURE 1, the novel encoder shown therein and constructed according to the invention comprises an opaque cylinder 1 having intelligence thereon in the form of a short transparent reference line 3 and a curved transparent reference or function line 5 shaped to provide a graph of a desired arbitrary preselected function of a variable condition. The interior of the drum may be lighted in any suitable manner and in the present embodiment an elongated fixed light source 7 is positioned within cylinder 1. The cylinder is rotated at relatively high speed by a motor 9 through a shaft 11.

A photo-electric pick-up 13 is moved in any suitable manner lengthwise of the cylinder and parallel to the cylinder axis and perpendicular to the direction of rotation of the cylinder in accordance with the variable condition. Pick-up 13 may comprise a photocell 17 enclosed within a shield 19 having a small aperture 21 therein adjacent the cylinder to transmit light from the light source 7 to the photocell when function line 5 is coincident with the aperture. In the embodiment shown, pick-up 13 is moved parallel to the cylinder axis through suitable linkage 25 by an aneroid 23 responsive to pressure.

A fixed pick-up 27 similar to pick-up 13 is positioned adjacent cylinder 1 and is aligned lengthwise of the cylinder with reference line 3. As cylinder 1 rotates, a first reference pulse referred to hereinafter as a reference pulse is produced by pick-up 27 each time reference line 3 passes the pick-up and a second reference pulse, hereinafter referred to as a function pulse is produced by pick-up 13 each time function line 5 passes the pick-up. One reference pulse and one function pulse are produced with each revolution of the cylinder and the spacing of the pulses is determined by the circumferential distance between the reference line and function line at the place being scanned by pick-up 13.

The encoder may be made independent of motor speed by providing a fixed photoelectric pick-up 31, similar to pick-up 13, for scanning a series of transparent increment lines 29 equally spaced about the circumference of cylinder 1 so that a pulse is produced each time an increment line 29 passes pick-up 31. With this arrangement, the accuracy of the encoder does not depend on uniform speed of rotation of motor 9 because the distance between reference line 3 and function line 5 is measured by increment lines 29 and not by a time interval.

The pulses from pick-ups 13, 27 and 31 are amplified by amplifiers 33, 35, and 37, respectively. The reference and function pulses from pick-ups 13 and 27 are applied to a "flip-flop" circuit 39 which may be of the kind shown at page 47 of "Arithmetic Operation in Digital Computers" by R. K. Richards and published by D. Van Nostrand Co., Inc. The reference and function pulses set and re-set the "flip-flop" reference circuit so that a direct current voltage is alternately provided at outputs 39a and 39b. The "flip-flop" circuit acts as a switching arrangement and provides a D.C. output at 39a when reset by a reference pulse and provides no output at 39a when set by a function pulse. The "flip-flop" circuit also provides a D.C. output at 39b when set by a function pulse and no output at 39b when reset by a reference pulse. Thus, the "flip-flop" circuit provides a D.C. output at 39a in the interval between the reference pulse and the function pulse and no output at 39a in the interval between the function pulse and the reference pulse. Also, the "flip-flop" circuit provides no D.C. output at 39b in the interval between the reference pulse and the function pulse and a D.C. output at 39b in the interval between the function pulse and the reference pulse.

The D.C. output 39a of "flip-flop" circuit 39 together with the amplified increment pulses from pick-up 31 are applied to an "and" gate 41 which may be of the kind shown at page 74 of "Arithmetic Operation in Digital Computers" by R. K. Richards and published by D. Van Nostrand Co., Inc. and which passes the increment pulses only when the gate is energized by the direct current output 39a from "flip-flop" 39. During each revolution of cylinder 1, the "and" gate passes the increment pulses in the interval between the reference pulse and the function pulse and blocks the increment pulses in the interval between the function pulse and the reference pulse.

The reference pulses from pick-up 27 are applied to the reset line of a digital counter 43 and each pulse resets the counter. The digital counter may be of the kind shown at page 194 of "Arithmetic Operation in Digital Computers" by R. K. Richards and published by D. Van Nostrand Co., Inc. The gated increment pulses from "and" gate 41 are applied to the digital counter 43 during the interval between the reference pulse and the function pulse and provide a parallel binary number in the counter. The increment pulses are stopped by "and" gate 41 during the interval between the function pulse and the reference pulse and do not reach the counter during this interval. During this interval also the D.C. output 39b of "flip-flop" 39 transfers the unchanging parallel binary number in the digital counter corresponding to the desired digital reading to the controlled or computer circuit using this information by means of connection 39c and designated T.C. (transfer command).

With the arrangement described, the mechanical displacement of pick-up 13 is converted at counter 43 to a digital output which is an arbitrary function of the displacement.

The novel encoder shown in FIG. 2 is similar to the encoder shown in FIG. 1 except that reference line 203 extends substantially the length of cylinder 201 and pick-up 213 scans both function line 205 and reference line 203. This arrangement facilitates laying out the function and reference lines. In this embodiment, pick-up 213 comprises an elongated light sensitive surface 217 and a shield 219 adjacent thereto and movable parallel to the cylinder axis. An ordinary bulb 207 may be used as the light source and the bulb is mounted within cylinder 201 on a bracket 208 fixed to shield 219 and extending into an open end of cylinder 201. Shield 219 has a small aperture 221 therein opposite bulb 207 which permits light from the interior of cylinder 201 to fall upon light sensitive surface 217 each time reference line 203 and function line 205 pass the aperture to provide alternate reference and function pulses. Increment lines 229 and pick-up 231 are provided similar to increment lines 29 and pick-up 31 in FIG. 1.

With this arrangement, the reference pulses and the function pulses are identified by setting a "flip-flop" circuit 238 with synchronizing pulses from a pulse former 210 connected to the same excitation source used to operate synchronous motor 209 which drives cylinder 201. One synchronizing pulse occurs just before the reference pulse for each cylinder revolution and provides only an approximate reference, since the motor may vary in phase and depart from exact synchronism with the frequency of the excitation source.

The reference and function pulses from pick-up 213 are amplified by amplifier 233 and the increment pulses from pick-up 231 are amplified by amplifier 237. The amplified reference and function pulses are applied to "and" gates 240 and 242 controlled by outputs 238a and 238b of "flip-flop" 238, respectively. "And" gate 242 is open and passes reference pulses only when a direct current voltage is present at output 238b of "flip-flop" circuit 238 and "and" gate 240 is open and passes function pulses only when a direct current voltage is present at output 238a of "flip-flop" circuit 238.

The synchronizing pulses from pulse former 210 set "flip-flop" circuit 238 so that a direct current voltage appears at output 238b and no voltage is present at output 238a. The reference pulses passed by "and" gate 242 reset "flip-flop" circuit 238 so that no direct current output is present at 238b and a direct current output appears at 238a.

With this arrangement the function pulses and reference pulses are separated and operate "flip-flop" circuit 239 to open and close "and" gate 241 so that increment pulses from amplifier 237 are passed to counter 243 only during the interval between the reference pulse and function pulse as described in connection with FIG. 1.

FIG. 3 shows a novel encoder similar to FIG. 1 wherein a plurality of function lines 305a, 305b, 305c and 305d are encoded on a cylinder 301 and the function lines are scanned by a single pick-up 313 which provides a function pulse for each function line. The cylinder has a reference line 303 and linearly spaced increment lines 329 thereon scanned by pick-ups 327 and 331, respectively, which provide reference and increment pulses. The function pulses from pick-up 313, the reference pulses from pick-up 327 and the increment pulses from pick-up 331 are amplified by amplifiers 333, 335, and 337, respectively.

Since a function pulse occurs for each function line with each revolution of the cylinder, suitable means are provided to identify the desired function pulse and reject the remaining function pulses upon each revolution of cylinder 301. The amplified function pulses from pick-up 313 and amplifier 333 are applied to "and" gate 302 which is controlled by digital counter 304 to pass only the desired function pulse and block the other pulses.

A code pattern applied to control lines 306a and 306b of diode matrix 306 is transferred in parallel through the diode matrix to counter 304 by each reference pulse from pick-up 327 applied to the matrix at control lines 306c to preset the counter upon each revolution of cylinder 301 so that a fixed number of function pulses are required to set the counter to 0. "And" gate 302 is energized by counter 304 so that the gate opens only when the counter reading is 0.

If, for example, the first function line 305a is selected, the reference pulse presets counter 304 to 0 under control of control lines 306a and 306b. Gate 302 then passes only the first function pulse. The function pulses also are applied via delay line 308 to counter 304, changing the counter reading to 1 thus closing gate 302.

If the second function pulse is to be selected, counter 304 is preset by the reference pulse to a reading corresponding to the maximum counter capacity. The first function pulse to appear after the reference pulse is blocked by gate 302 but is applied via delay line 308 to counter 304 advancing the counter reading to 0. The second function pulse, which is the desired pulse, then passes directly through gate 302 and, via delay line 308 advances counter 304 to 1, thus again closing gate 302. Any desired function on cylinder 301 can be selected in this manner by appropriately presetting counter 304 by the reference pulse with a suitable code pattern on control lines 306a and 306b of diode matrix 306.

The selected function pulse from "and" gate 302 and amplified reference pulse from pick-up 327 and amplifier 335 are applied to "flip-flop" circuit 339 and the direct current output of "flip-flop" circuit 339 controls "and" gate 341 to pass to digital counter 343 increment pulses from pick-up 331 in the interval between the reference pulse and the selected function pulse and to block increment pulses in the interval between the selected function pulse and reference pulse for each revolution of cylinder 301, similarly to FIG. 1.

The encoder shown in FIG. 4 is similar to that shown in FIG. 3 except that in FIG. 4 function lines 405a, 405b and 405c of different colors are used with correspondingly colored filters 419a, 419b, and 419c on pick-ups 413a, 413b, and 413c to facilitate identifying the desired function pulses. With this arrangement, the function pulse for each function line appears on a separate pick-up.

Reference line 403 and linearly spaced increment lines 429 are scanned by fixed pick-ups 427 and 431, respectively. Function pulses from pick-ups 413a, 413b, and 413c are amplified by amplifiers 433a, 433b, and 433c, respectively. Also, reference and increment pulses from pick-ups 427 and 431 are amplified by amplifiers 435 and 437, respectively.

With this arrangement the function pulses are readily identified from one another since they appear separately at the outputs of amplifiers 433a, 433b, and 433c. Amplifiers 433a, 433b, and 433c are connected to "and" gates 434a, 434b, and 434c, respectively. Each of these "and" gates has a second input which opens only one "and" gate during each cylinder revolution so that only one function pulse will appear at the output of "or" gate 436 connected to the "and" gates. The "or" gate may be of the kind shown at page 74 of "Arithmetic Operation in Digital Computers" by R. K. Richards and published by D. Van Nostrand Co., Inc. Selection of the desired function is therefore simply accomplished by opening the appropriate "and" gate. The selected function pulse is applied to "flip-flop" circuit 439 and the desired reading of increment pulses is obtained in digital counter 443 in a manner identical to FIG. 1.

The arrangement in FIG. 5 stores the intelligence on a disc 601 instead of on cylinders as in the embodiments shown in FIGS. 1 thru 4. The arrangement shown in FIG. 5 stores a plurality of arbitrary functions as in FIG. 3. The intelligence comprises a graph arranged circularly about the center of the disc in the form of function lines 605a, 605b, and 605c, equally spaced increment lines 629 and a reference line 603. A radially movable pick-up 613 scans the function lines and fixed pick-ups 631 and 627 scan the increment lines and reference line, respectively. The function pulses from pick-up 613, the increment pulses from pick-up 631 and the reference pulses from pick-up 627 are amplified and control a digital counter in the same manner as in FIG. 3.

The encoder described herein and constructed according to the invention converts mechanical displacements to digital numbers according to any arbitrary predetermined function of the displacement and the encoder is accurate, compact, light in weight and has a high degree of resolution. The encoder may be used to provide a substantial number of arbitrary functions of a variable on a single unit and the functions are truly arbitrary and may include steep slopes and discontinuities. The encoder operates independently of the encoder drive motor speed and is simple in design and may readily be mass produced.

Instead of using photoelectric pick-ups responsive to illuminated transparent function lines as described herein, capacitive or inductive sensing may be used by inscribing the reference and function lines as conducting surfaces or as magnetic material and using capacitive or inductive pick-ups to detect the passage of a line and provide corresponding pulses.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art. While in the embodiments shown the cylinder or disc is rotated and the pick-up is moved in response to a condition, in some instances it may be desirable to rotate the pick-up and move the cylinder or disc in response to the condition or some other arrangement may be used for providing the desired relative movement. Also, while the several embodiments have been described for convenience as counting the increment pulses in the interval between the reference and function pulses, it should be understood that in some instances it may be desirable to count the increment pulses in the interval between the function and reference pulses in which case the function pulses would start a counting period and the reference pulses would end the counting period.

What is claimed is:

1. A function encoder comprising a member having reference and function intelligence thereon, the function intelligence comprising a graph varying in accordance with a condition according to a preselected function, pick-up means for scanning the reference and function intelligence and providing reference and function signals and including a part responsive to the condition to scan the graph in accordance with the condition to vary the interval between the signals in accordance with the condition, and means for measuring the interval between the signals.

2. A function encoder comprising a member having reference, increment, and function intelligence thereon, the function intelligence comprising a graph varying in accordance with a condition according to a preselected function, pick-up means for scanning the reference and function intelligence and providing reference and function signals and including a part responsive to the condition to scan the graph in accordance with the condition to vary the interval between the signals in accordance with the condition, and pick-up means for scanning the increment intelligence to provide an output for measuring the interval between the signals.

3. A function encoder comprising a member having reference, increment, and function intelligence thereon, the function intelligence comprising a graph varying in accordance with a condition according to a preselected function, pick-up means for scanning the reference and function intelligence and providing reference and function signals and including a part movable along the graph in response to the condition to scan the graph at a point corresponding to the condition to vary the interval between the signals in accordance with the condition, and pick-up means for scanning the increment intelligence to provide an output for measuring the interval between the signals.

4. A function encoder comprising a member having reference, increment, and function intelligence thereon, the function intelligence comprising a graph varying in accordance with a condition according to a preselected function, pick-up means for scanning the reference and function intelligence and providing reference and function signals and including a part movable along the graph perpendicularly to the direction of rotation of the member in response to the condition to scan the graph at a point corresponding to the condition to vary the interval between the signals in accordance with the condition, and pick-up means for scanning the increment intelligence to provide an output for measuring the interval between the signals.

5. A function encoder comprising a member having reference, increment, and function intelligence thereon, the function intelligence comprising a graph varying in accordance with a condition according to a preselected function, pick-up means for scanning the reference and function intelligence and providing reference and function signals and including a part responsive to the condition to scan the graph at a point corresponding to the condition to vary the interval between the signals in accordance with the condition, pick-up means for scanning the increment intelligence and providing pulses, counting means connected to the pick-up means providing increment pulses, and means connected to the pick-up means providing reference and function signals and controlling the counting means to respond to increment pulses in the interval between the signals to provide an output corresponding to the condition according to the preselected function.

6. A function encoder comprising a member having reference, increment, and function intelligence thereon, the function intelligence comprising a graph varying in accordance with a condition according to a preselected function, pick-up means for scanning the reference and function intelligence and providing reference and function signals and including a part responsive to the condition to scan the graph at a point corresponding to the condition to vary the interval between the signals in accordance with the condition, pick-up means for scanning the increment intelligence and providing pulses in accordance with the interval between the signals, and means connected to the pick-up means providing the reference and function signals and the increment pulses and responsive to the increment pulses in the interval between the signals and providing an output corresponding to the condition according to the preselected function.

7. A function encoder comprising a member having reference, increment, and function intelligence thereon, the function intelligence comprising a graph varying in accordance with a condition according to a preselected function, pick-up means for scanning the reference and function intelligence and providing reference and function signals, pick-up means for scanning the increment intelligence and providing pulses, means providing relative movement between the member and pick-up means, said pick-up means scanning the function intelligence being responsive to the condition to scan the graph at a point corresponding to the condition to vary the interval between the signals in accordance with the condition, and means connected to the pick-up means providing the reference and function signals and the increment pulses and responsive to the increment pulses in the interval between the signals and providing an output corresponding to the condition according to the preselected function.

8. A function encoder comprising a member having a reference line and an elongated function line thereon, the latter varying in accordance with a condition according to a preselected function, pick-up means for scanning the member and providing a pulse each time the reference line and function line pass the pick-up means and having a part movable lengthwise of the function line in response to the condition to scan the function line at a point corresponding to the condition to vary the interval between pulses in accordance with the condition, and means for measuring the interval between the pulses.

9. A function encoder comprising a member having reference, increment, and function intelligence thereon, the function intelligence comprising a graph varying in accordance with a condition according to a preselected function, pick-up means for scanning the reference and function intelligence and providing reference and function signals and including a part movable lengthwise of the graph in response to the condition to scan the graph at a point corresponding to the condition to vary the interval between the signals in accordance with the condition, and pick-up means for scanning the increment intelligence to provide an output for measuring the interval between the signals.

10. A function encoder comprising a cylindrical member having reference, increment, and function intelligence thereon, the function intelligence comprising a graph varying in accordance with a condition according to a preselected function, pick-up means for scanning the reference and function intelligence and providing reference and function signals and including a part movable parallel to the cylinder axis in response to the condition to scan the graph at a point corresponding to the condition to vary the interval between signals in accordance with the condition, pick-up means for scanning the increment intelligence and providing pulses on coincidence of the pick-up means with the increment intelligence, a counter connected to the pick-up means providing increment pulses, and means connected to the pick-up means providing reference and function signals for applying the increment pulses to the counter only in the interval between the signals.

11. A function encoder comprising a member having a reference line and an elongated function line thereon, the latter comprising a graph varying in accordance with a condition according to a preselected function, a motor rotating the member, a light source illuminating the lines on the member, a fixed photoelectric pick-up for scanning the member and responsive to the reference line and providing a pulse each time the reference line passes the pick-up, a photoelectric pick-up movable in response to the condition to scan the function line at a point corresponding to the condition and providing a pulse each time the function line passes the pick-up, and means for measuring the interval between the pulses.

12. A function encoder as described in claim 11 in which the means for measuring the interval between the pulses includes a series of equally spaced increment lines on the member and a fixed photoelectric pick-up providing a pulse each time an increment line passes the pick-up.

13. A function encoder as described in claim 12 which includes a counter and means connected to the pick-ups responsive to the reference and function lines for applying the increment pulses to the counter in the interval between the reference and function pulses.

14. A function encoder comprising a member having reference and increment intelligence and a plurality of function intelligence thereon, the latter varying in accordance with a condition according to preselected functions, pick-up means for scanning the intelligence to provide reference, increment and function pulses on coincidence of the pick-up means and the corresponding intelligence, means for controlling the pick-up means scanning the function intelligence in accordance with the condition to vary the interval between the reference pulse and a preselected function pulse in accordance with the condition, a counter connected to the pick-up means providing increment pulses, and means connected to the pick-up means providing reference and function pulses for applying the increment pulses to the counter in the interval between the reference pulse and preselected function pulse.

15. A function encoder comprising a disc having increment intelligence and a plurality of reference intelligence thereon, one reference intelligence comprising a graph arranged circularly about the center of the disc and varying in accordance with a condition according to a preselected function, a motor for rotating the disc, pick-up means for scanning the intelligence to provide increment and first and second reference pulses on coincidence of the pick-up means and the intelligence, the pick-up means for providing the one reference pulse being movable parallel to the radius of the disc to vary the interval between the reference pulses according to the preselected function, a counter connected to the pick-up means providing increment pulses, and means connected to the pick-up means providing reference pulses for applying the increment pulses to the counter only in the interval between the reference pulses.

16. A function encoder comprising a member having a reference line and a plurality of function lines thereon, the latter varying in accordance with a condition according to preselected functions, a motor rotating the member, a light source illuminating the lines on the member, a fixed photoelectric pick-up responsive to the reference line and providing a pulse each time the reference line passes the pick-up, a photoelectric pick-up movable in response to the condition and responsive to the function lines and providing a pulse each time a function line passes the latter pick-up, and means for measuring the interval between pulses from the pick-ups, one of the pulses corresponding to a preselected function pulse.

17. A function encoder as described in claim 16 in which the movable photoelectric pick-up includes a plurality of photo cells each responsive to a different color and the function lines are of corresponding colors to facilitate preselection of the function pulses.

18. A function encoder as described in claim 16 in which the means for measuring the interval between the pulses includes a series of equally spaced increment lines on the member and a fixed photoelectric pick-up providing a pulse each time an increment line passes the pick-up.

19. A function encoder as described in claim 18 which includes a counter and means connected to the pick-ups responsive to the reference and function lines for applying the increment pulses to the counter in the interval between the pulses.

20. A function encoder comprising a member having reference intelligence and a plurality of function intelligence thereon, the latter varying in accordance with a condition according to preselected functions, pick-up means for scanning the intelligence on the member and the pick-up means scanning the function intelligence being controlled in accordance with the condition, and means connected to the pick-up means scanning the reference and function intelligence for providing an output corresponding to the relative displacement of the reference and a preselected function intelligence at the place the function intelligence is being scanned by the associated pick-up means.

No references cited.